United States Patent
Kakinuma

(10) Patent No.: US 6,839,966 B2
(45) Date of Patent: Jan. 11, 2005

(54) BRANCH PIPE JOINT AND METHOD OF CONNECTING PIPES USING THE PIPE JOINT

(75) Inventor: Osamu Kakinuma, Shinjuku-ku (JP)

(73) Assignee: Kakinuma Kinzoku Seiki Co., Ltd., Tokyo (JP)

( * ) Notice: Subject to any disclaimer, the term of this patent is extended or adjusted under 35 U.S.C. 154(b) by 2 days.

(21) Appl. No.: 09/956,912

(22) Filed: Sep. 21, 2001

(65) Prior Publication Data

US 2002/0033600 A1 Mar. 21, 2002

(30) Foreign Application Priority Data

Sep. 21, 2000 (JP) .......................................... 2000-287604

(51) Int. Cl.[7] .............................................. B21D 51/16
(52) U.S. Cl. ......................... 29/890.14; 29/282; 29/237
(58) Field of Search .......................... 285/125.1, 122.1, 285/124.2, 124.4, 124.5, 129.1, 133.11, 133.3, 136.1, 137.11, 141.1, 131.1, 12; 29/282, 237, 890.14

(56) References Cited

U.S. PATENT DOCUMENTS

| | | | | |
|---|---|---|---|---|
| 913,036 A | * | 2/1909 | Nelson ..................... | 285/136.1 |
| 1,713,640 A | * | 5/1929 | Blanchard .............. | 285/137.11 |
| 1,966,403 A | * | 7/1934 | Durham ................... | 285/133.3 |
| 2,053,443 A | * | 9/1936 | Ringel et al. .............. | 122/462 |
| 2,217,737 A | * | 10/1940 | Ehnts ....................... | 285/136.1 |
| 2,441,204 A | * | 5/1948 | Nusbaum ................. | 285/125.1 |
| 2,495,615 A | * | 1/1950 | Vander Clute ........... | 285/141.1 |
| 2,710,443 A | * | 6/1955 | Webb ....................... | 285/125.1 |
| 2,762,635 A | * | 9/1956 | Lorber ..................... | 285/131.1 |
| 3,262,497 A | * | 7/1966 | Worthen et al. ............ | 165/176 |
| 3,282,612 A | * | 11/1966 | Younger ................... | 285/124.2 |
| 3,470,893 A | * | 10/1969 | Nelson ..................... | 285/125.1 |
| 4,015,321 A | * | 4/1977 | Witter ...................... | 285/136.1 |
| 4,175,779 A | * | 11/1979 | Apblett, Jr. .............. | 285/136.1 |
| 4,321,911 A | * | 3/1982 | Offutt ....................... | 285/122.1 |
| 4,498,693 A | * | 2/1985 | Schindele ................ | 285/124.5 |
| 4,545,604 A | | 10/1985 | Braathen | |
| 4,589,688 A | | 5/1986 | Johnson | |
| 4,645,242 A | * | 2/1987 | Coleman et al. ......... | 285/141.1 |
| 5,400,951 A | * | 3/1995 | Shiroyama et al. ......... | 228/168 |
| 5,620,314 A | * | 4/1997 | Worton ........................ | 417/550 |
| 6,196,306 B1 | * | 3/2001 | Aikawa et al. ............. | 165/178 |

FOREIGN PATENT DOCUMENTS

| | | | | |
|---|---|---|---|---|
| DE | 3209950 A1 | | 9/1983 | |
| EP | 0036984 | * | 10/1981 | .............. 285/122.1 |
| EP | 0415260 A | | 3/1991 | |
| GB | 2072291 | * | 9/1981 | .............. 285/122.1 |
| JP | 11-241798 A | | 9/1999 | |

* cited by examiner

*Primary Examiner*—David Bochna
(74) *Attorney, Agent, or Firm*—Oblon, Spivak, McClelland, Maier & Neustadt, P.C.

(57) ABSTRACT

A branch pipe joint comprises a branch pipe joint body to which various pipes each having a different diameter are connected; and connecting pipes to be provided between the branch pipe joint body and the pipes. The connecting pipes are selected from various kinds of connecting pipes in accordance with sizes of fitting portions of the pipes. The selected pipe has a fitting portion at one end portion thereof to which the pipe is fitted, while the other end portion of the connecting pipe is connected to a communication port provided to the branch pipe joint body.

1 Claim, 11 Drawing Sheets

BRANCH PIPE JOINT AND METHOD OF CONNECTING PIPES USING THE PIPE JOINT

CROSS REFERENCE TO RELATED APPLICATIONS

The present application is based on Japanese patent application 287604/2000, filed Sep. 21, 2000, which is herein incorporated by reference in its entirety.

BACKGROUND OF THE INVENTION

1. Field of the Invention

The present invention relates to a branch pipe joint and a method of connecting pipes using the branch pipe joint, and more particularly to a branch pipe joint having a number of connecting pipes, each having a different inner diameter, and to a method of connecting pipes using the above branch pipe joint.

2. Description of the Related Art

Conventionally, there has been widely used a multi-unit type air conditioner in which a plurality of indoor units are provided. The multi-unit type air conditioner carries out a refrigerating cycle and is schematically shown as 61 in FIG. 16. The air conditioner 61 is constituted by sequentially connecting a compressor 62, a four-way valve 63, an outdoor side heat exchanger 64, an outdoor side refrigerant controller 65, a branch pipe joint 66b, indoor side refrigerant controllers 67, a plurality of indoor side heat exchangers 68 (68a, 68b and 68c) and a branch pipe joint 66a. The branch pipe joint 66a is connected to the branch pipe joint 66b through the respective indoor side refrigerant controllers 67 and the indoor side heat exchangers 68 (68a, 68b and 68c). The branch pipe joint 66b has the same shape as that of the branch pipe joint 66a. In FIG. 16, the solid arrows indicate a flow direction of the refrigerant at the time of heating operation of the air conditioner, while the broken arrows indicate a flow direction of the refrigerant at the time of cooling operation.

As shown in FIGS. 17 and 18, each of the branch pipe joints 66 (66a and 66b) comprises a branch pipe joint body 67 having a cylindrical closed shape; a plurality of connecting pipes 68 welded to the branch pipe joint body 67 in a longitudinal direction thereof so with a constant interval p1 therebetween; and a common connecting pipe 69 welded to one end surface of the branch pipe joint body 67.

The plurality of the connecting pipes 68 are normally formed of copper tubes, and have the same shape. As shown in FIG. 19, each of the connecting pipes 68 has a pipe shape having multiple steps whose outer and inner diameters are gradually reduced in an axial direction. A first step portion 68a communicating with a welding root portion 68z has an inner diameter of 19.0 mm, a second step portion 68b communicating with the first step 68a has an inner diameter of 15.9 mm, a third step portion 68c communicating with the second step 68b has an inner diameter of 12.7 mm, and a fourth step portion 68d communicating with the third step portion 68c has an inner diameter of 9.5 mm, respectively.

Accordingly, when the air conditioner 61 shown in FIG. 16 is assembled using the branch pipe joint 66 at an installation site of the multi unit type air conditioner, the branch pipe joint 66, to which the plurality of connecting pipes 68 and the common connecting pipe 69 are welded, is prepared. Then, as shown in FIGS. 20 and 21, a position of each connecting pipe 68 having an inner diameter corresponding to an outer diameter of pipe 70 (70a, 70b) to be connected to the branch pipe joint 66 is selected, and the connecting pipe 68 is cut at that position by means of a pipe cutter. After an inner surface of the connecting pipe 68 is reshaped and finished, the pipe 70 is inserted into the connecting pipe and the connected portion is welded. In the case of the common connecting pipe 69, the same procedure is repeated, thereby to connect and weld a pipe 71 to the common connecting pipe 69.

However, in these cases, the connecting pipe 68 and the common connecting pipe 69 are cut at the installation site, so that copper powder is unavoidably generated and remains adhered to inner portions of the connecting pipe 68 and the common connecting pipe 69. When the air conditioner 61 is assembled and operated with the copper powder being adhered, blocking and jamming are liable to result at the outdoor side refrigerant controller 65, the indoor side refrigerant controller 67 or the like, which can constitute a cause of failure of the air conditioner 61.

Therefore, it has been necessarily required to clean the inner surfaces of the connecting pipes 68 and the common connecting pipe 69 after the connecting pipes 68 and the common connecting pipe 69 are cut, and to reshape the inner surfaces deformed by the pipe cutter, thus greatly increasing the work load for the assembly workers.

In addition, since the connecting pipe 68 is cut by means of the pipe cutter, it is required to provide a large pitch p1 of about 160 mm between the adjacent connecting pipes 68 so as to permit the pipe cutter to freely operate without any obstructions, so that the branch pipe joint 66 being formed must have a large size.

SUMMARY OF THE INVENTION

The present invention has been achieved to solve the above described problems, and an object of the invention is to provide a branch pipe joint and a method of connecting pipes using the branch pipe joint which can be formed in a small size, and capable of being easily assembled into an air conditioner without requiring a cutting operation for the connecting pipes.

To achieve the above and other objects, according to one aspect of the present invention, there is provided a branch pipe joint comprising a branch pipe joint body having a hollow closed shape; a plurality of communication ports formed in the branch pipe joint body; a plurality of connecting pipes, each of which has one end portion fitted to the communication port while the other end portion is fitted to one of a plurality of pipes so that a fluid flows through the connecting pipes; and a common communication port provided to the branch pipe joint body through which the fluid flows; wherein the plurality of connecting pipes are composed of various pipes whose one end portions are fitted to the branch pipe joint body while the other end portions are fitted to the plurality of pipes through fitting portions, and sizes of the fitting portions are different from each other.

According to the above one aspect of the present invention, it is not necessary to select a position of the connecting pipe in accordance with an outer diameter of the pipe to be connected, and is not necessary to cut the connecting pipe at the position by means of a pipe cutter. Further, there is no need to reshape the inner surfaces of the deformed connecting pipes and to perform a troublesome and complicated cleaning operation for removing copper powder generated by the cutting operations. Therefore, the air conditioner can be easily assembled without requiring the cutting operation for the connecting pipes. In addition, since the pipe cutter is not used for connecting pipes, the pitch between the adjacent connecting pipes can be reduced to be about ½ of that of conventional case, so that the branch pipe joint can be formed of a small size.

In the above branch pipe joint according to one aspect of the present invention, it is preferable that the plurality of connecting pipes are selected from a group consisting of various pipes whose fitting portions are different from each other, and the various pipes and the branch pipe joint body are packed in the same package.

In the above branch pipe joint according to one aspect of the present invention, it is also preferable that said fitting portions are formed so as to have different inner diameters in accordance with the sizes of said connecting pipes. Further, it is also preferable that said fitting portions are formed so as to have different outer diameters in accordance with the sizes of said connecting pipes. Further, it is preferable that the outer diameters of end portions of the plurality of connecting pipes to be fitted to the plurality of communication ports are identical to each other. Further, it is also preferable that the inserting portions formed in the plurality of connecting pipes to be fitted to the plurality of communication ports have the same shape as each other.

In another aspect of the present invention, there is provided a method of connecting pipes, comprising the steps of preparing a branch pipe joint body having a hollow shape and a plurality of communication ports; selecting connecting pipes to be fitted to a plurality of pipes that are to be connected to the branch pipe joint body from a group consisting of various connecting pipes having different inner diameters, the connecting pipes and the branch pipe joint body having been packed in one package; and connecting the pipes to the branch pipe joint body through the connecting pipes.

According to the above another aspect of the present invention, it is, not necessary to select a position of the connecting pipe in accordance with an outer diameter of the pipe to be connected, and is not necessary to cut the connecting pipe at the position by means of a pipe cutter. Further, there is no need to reshape the inner surfaces of the deformed connecting pipes and to perform a troublesome and complicated cleaning operation for removing copper powder generated by the cutting operations. Therefore, the air conditioner can be easily assembled without requiring the cutting operation for the connecting pipes.

In the above method of connecting pipes according to another aspect of the present invention, it is preferable that the connecting pipes are selected from a group consisting of connecting pipes each having an identical outer diameter at one end portion thereof.

In the above method of connecting pipes according to another aspect of the present invention, it is preferable that the connection is performed by fitting then welding said connecting pipes and the pipes.

In still another aspect of the present invention, there is provided a method of connecting pipes, comprising the steps of preparing a branch pipe joint body having a hollow shape and a plurality of communication ports; selecting connecting pipes to be fitted to a plurality of pipes which are to be connected to the branch pipe joint body from a group consisting of at least one kind of connecting pipes having different inner diameters, the connecting pipes and the branch pipe joint body having been packed in one package; and connecting a part of the pipes to the branch pipe joint body through the connecting pipes while directly connecting the remaining pipes to the branch pipe joint body.

According to this aspect of the present invention, as in the former aspect, there can be provided an effect of easily performing the assembling work of the air conditioner. In addition to this effect, the number of the connecting pipes required to be prepared can be effectively reduced.

BRIEF DESCRIPTION OF THE DRAWINGS

The present invention will become more apparent upon a consideration of the following detailed explanations of the preferred embodiments of the present invention taken in conjunction with the accompanying drawings. It is to be understood that the embodiments shown in the accompanying drawings are not for particularly specifying the present invention but for merely making the explanations and understanding of the present invention more easily.

In the accompanying drawings.

DESCRIPTION OF THE PREFERRED EMBODIMENTS

Next, the preferred embodiments of the present invention will be described with reference to the accompanying drawings.

Figure 1:
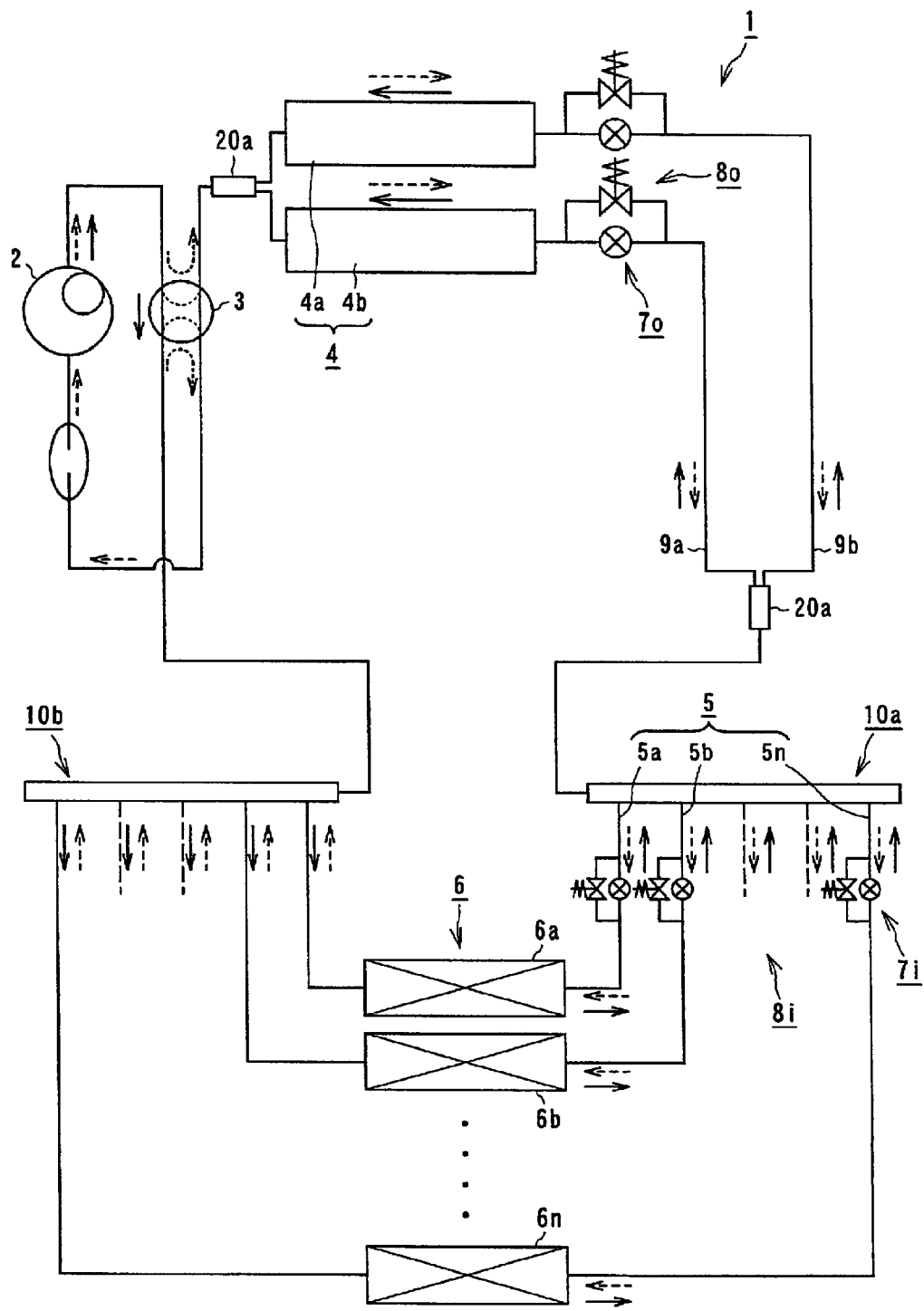
FIG. 1 is a schematic view showing a multi-unit type air conditioner using one embodiment of a branch pipe joint according to the present invention.

FIG. 1 shows a multi-unit type air conditioner 1, a so called multi-air-conditioner, using a branch pipe joint of a first embodiment according to the present invention.

The air conditioner 1 is constituted by sequentially connecting a compressor 2, a four-way valve 3, a yoked type branch pipe joint 20a, a plurality, for example two, sets of outdoor side heat exchangers 4 (4a, 4b), another yoked type branch pipe joint 20a, a multi-branched type branch pipe joint 10a, a plurality of indoor side heat exchangers 6 (6a, 6b - - - and 6n) and a multi-branched type branch pipe joint 10b connected through pipes 5 (5a, 5b, - - - and 5n). In addition, in association with the indoor side heat exchangers 6 and the outdoor side heat exchangers 4, a plurality of electronic expansion valves 7i, 7o for controlling the flow of the refrigerant and solenoid valves 8i, 8o are provided. The reference numeral 9 (9a and 9b) denote pipes for communicating the indoor side heat exchangers 4 (4a and 4b) with the yoked type branch pipe joints 20a. In FIG. 1, the solid arrows indicate a flow direction of the refrigerant at the time of heating operation of the air conditioner, while the broken arrows indicate a flow direction of the refrigerant at the time of cooling operation.

Figure 2:
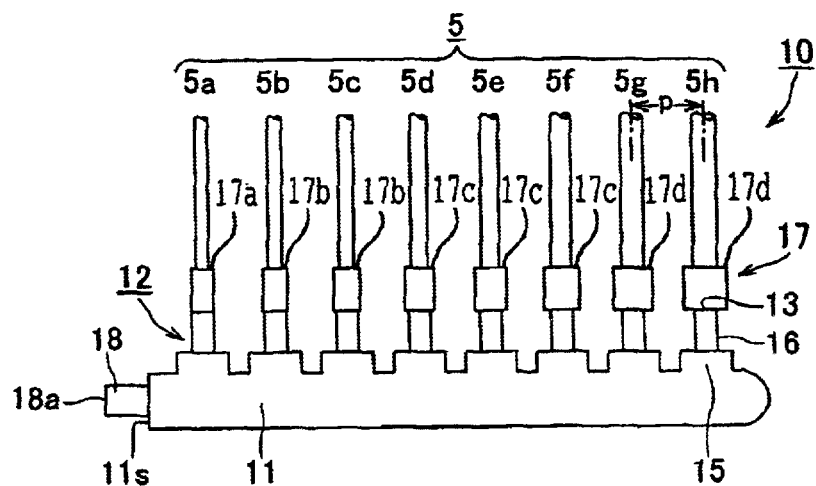
FIG. 2 is a front view showing a first embodiment of the branch pipe joint according to the present invention.
Figure 3:
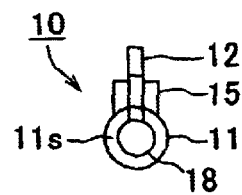
FIG. 3 is a side view showing one embodiment of the branch pipe joint according to the present invention.
Figure 4:
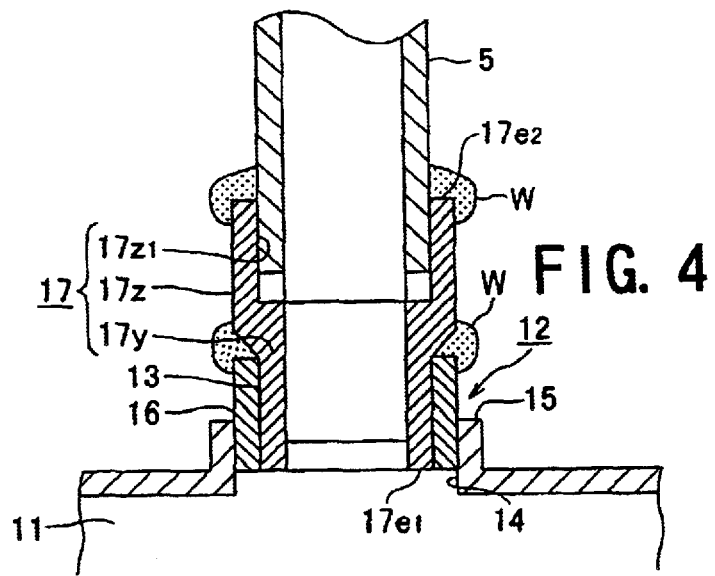
FIG. 4 is a cross sectional view showing an embodiment of a connecting portion of the branch pipe joint according to the present invention.

As exemplarily shown in FIGS. 2, 3 and 4, the branch pipe joint 10 (10a and 10b) comprises a branch pipe joint body 11 composed of copper and having a hollow cylindrically closed shape. This branch pipe joint body 11 comprises a plurality of projecting portions 12 and a plurality of communication ports 13 formed to the projecting portions 12.

Figure 5:
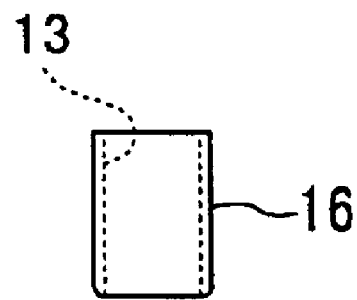
FIG. 5 is a front view showing an embodiment of an attaching pipe portion used in the branch pipe joint according to the present invention.

The projecting portions 12 comprise rising portions 15 formed at opening portions 14 provided in the branch pipe joint body 11, and a number of attaching pipe portions 16 welded to the rising portions 15. Each of the rising portions 15 is formed by burring the opening portion 14. The attaching pipe portion 16 has the inner diameter shown in FIG. 5, and an inner wall of the attaching pipe portion 16 constitutes the communication port 13. The projecting portions 12 are arranged so as to provide a predetermined pitch p as shown in FIG. 2. Therefore, the pipes 5 can be firmly connected to the branch pipe joint body 11 through connecting pipes 17 as described later without causing any leakage of the fluid (refrigerant).

Figure 6:
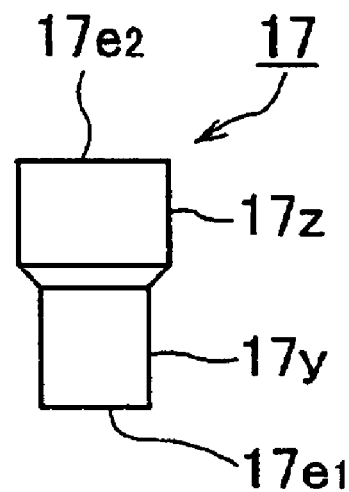
FIG. 6 is a front view showing a first embodiment of a connecting pipe used in the branch pipe joint according to the present invention.

The branch pipe joint 10 comprises connecting pipes 17 separately formed from the branch pipe joint body 11. As shown in FIGS. 4 and 6, one end portions $17e_1$ of the connecting pipes 17 are fitted into the respective communication ports 13 having the same inner diameters as the outer diameters of the connecting pipes 17, while the other end portions of $17e_2$ of the connecting pipes 17 are fitted around one pipe 5 among the pipes 5 (5a, 5b, - - - and 5n) having various outer diameters.

In addition, the pipes 5 (5a, 5b, - - - and 5n), the connecting pipes 17 and the branch pipe joint body 11 are welded, so that the pipes 5 (5a, 5b, - - - and 5n) are communicated with the branch pipe joint 10 through the connecting pipes 17. A fitting portion loosely fits into the communication port 13 formed in the projecting portion 12 of the branch pipe joint body 11. The fitting portion comprises an inserting portion 17y formed so as to have the same outer diameter as that of one end portion $17e_1$ of the connecting pipe having an outer diameter of, for example, 15.9 mm; and an outer fitting portion 17z communicating with the inserting portion 17y, the outer fitting portion having an outer diameter larger than that of inserting portion 17y and comprising an opening portion $17z_1$ having an inner diameter capable of loosely fitting the pipe 5. Since this outer fitting portion 17z is connected to the pipes 5 having various outer diameters, the inner diameters of the outer fitting portions 17z are set to various sizes. In this case, for example, the inner diameters consist of four kinds of diameters of 19.0 mm, 15.9 mm, 12.7 mm and 9.5 mm.

With respect to one branch pipe joint, it is preferable that all of the connecting pipes 17 are formed to provide the inserting portions having the same outer diameters, more preferably having the same outer diameter and the inner diameter, i.e., the same shapes. Due to the above arrangement, the number of kinds of the connecting pipes 17 can be reduced to a required minimum level.

In addition, at one end surface 11s of the branch pipe joint body 11, there is welded a common connecting pipe 18 having a common communication port 18a and having the same inner diameter as that of the attaching pipe portions 16 constituting the projecting portions 12. In a case where the rising portion can be firmly formed to one end surface of the branch pipe joint body so as to obtain a circular shape, the common connecting pipe 18 can be directly formed to one end surface without providing the attaching pipe portion. Further, taking a flow rate of the refrigerant into consideration, the common connecting pipe may be formed so as to have an inner diameter larger than that of the attaching pipe portion.

As described above, when the inner diameters of the attaching pipe portions 16 are standardized to have the same value, more preferably to have the same shape, the outer diameters of one end portions of the connecting pipes fitting to the attaching pipe portions 16 can be the same. As a result, the number of kinds of the connecting pipes can be reduced.

Further, since the flow rate of the refrigerant flowing in the air conditioner is varied in accordance with a capacity of the of the air conditioner using the branch pipe joint, an outer diameter of one end portion of a communication pipe may be standardized to a predetermined size which is different from the outer diameter of one end portion of the connecting pipe. That is, when the outer diameters of one end portions of the communication pipes to be attached to one branch pipe joint body are standardized to be identical, the kinds of the connecting pipes can be reduced.

In addition, although the kinds of the connecting pipes are slightly increased, when several kinds of communication pipes, each having different outer diameters, are prepared and a connecting pipe having a larger diameter at one end portion thereof is applied to a large diametered pipe in accordance with the flow rate of the refrigerant flowing in the branch pipe joint, it becomes possible to make the flow of the refrigerant smooth.

Further, in a case where the above projecting portion can be formed circularly, and with a sufficient strength and height from the branch pipe joint body, the projecting portion can be formed of only the rising portion without providing the attaching pipe portion. When the projecting portion 12 is provided with the attaching pipe portion 16, the welding operation after the connecting pipes 17 are fitted to the branch pipe joint body 11 can be performed easily and securely.

Figure 7:
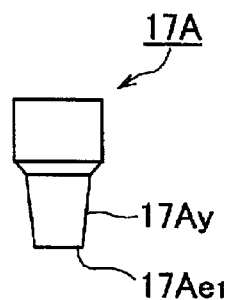
FIG. 7 is a front view showing a second embodiment of a connecting pipe used in the branch pipe joint according to the present invention.

By the way, although the inserting portion 17y is formed so as to have the same outer diameter as that of one end portion $17e_1$, the inserting portion need only have a shape capable of fitting with any of the communication ports 13 formed in the branch pipe joint body. For example, as shown in FIG. 7, there can be also used a communication pipe 17A having a hollow truncated cone shape whose inserting portion 17Ay is gradually enlarged from one end portion $17Ae_1$, thereof with a slight taper.

Figure 8:
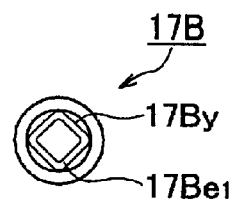
FIG. 8 is a plan view showing a second embodiment of a connecting pipe used in the branch pipe joint according to the present invention.

Further, as shown in FIG. 8, there can be also used a communication pipe 17B having a hollow square column shape whose inserting portion 17By extends from one end portion $17Be_1$ thereof having a square shape so as to provide a constant cross sectional shape in an axial direction.

Figure 9:
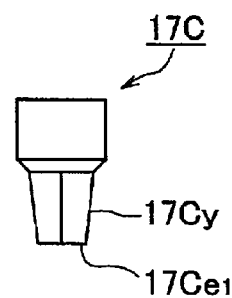
FIG. 9 is a front view showing a third embodiment of a connecting pipe used in the branch pipe joint according to the present invention.
Figure 10:
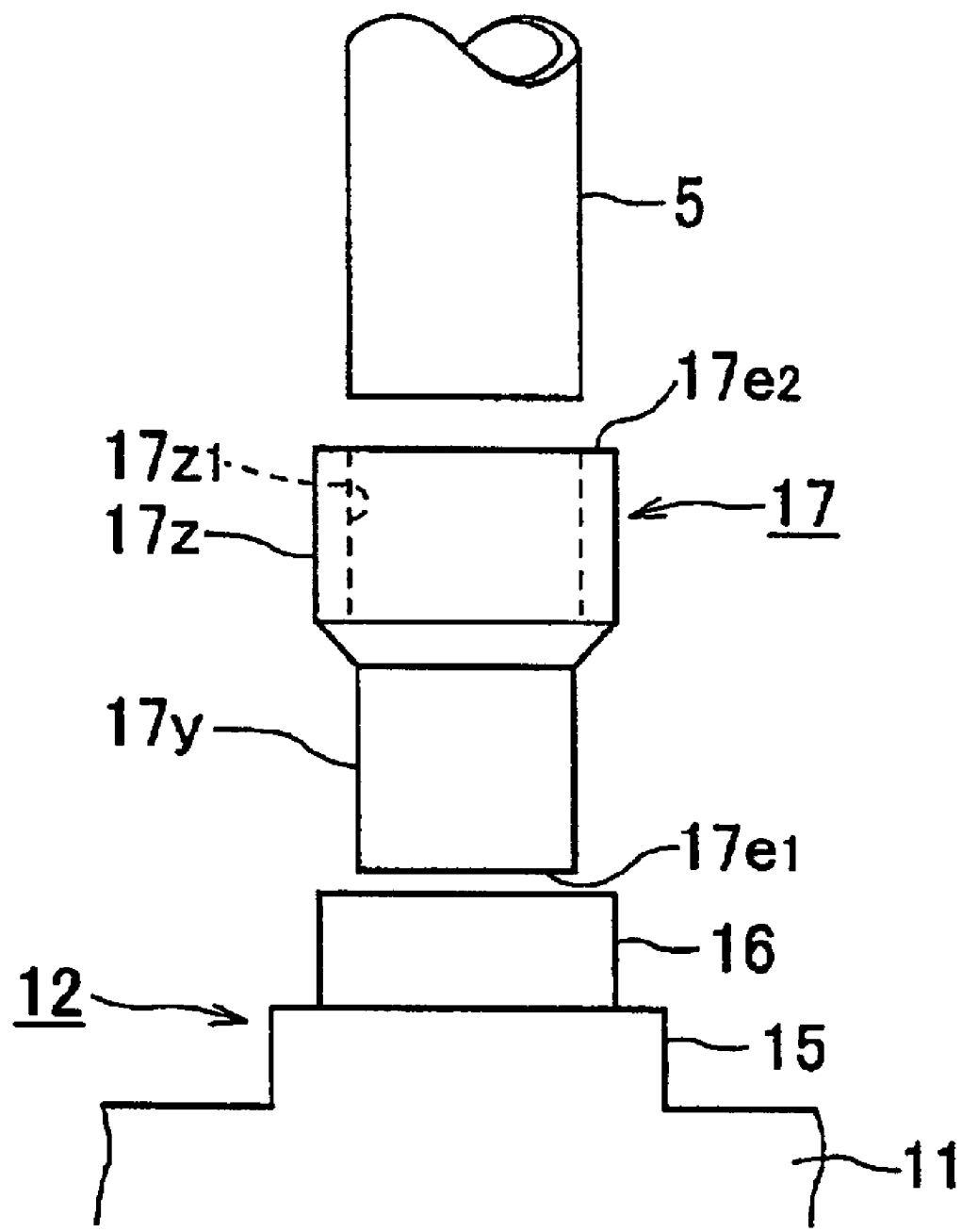
FIG. 10 is an explanatory view showing a method of connecting pipes using the branch pipe joint according to the present invention.

Furthermore, as shown in FIG. 9, there can also be used a communication pipe 17C having a hollow square pyramid shape whose inserting portion 17Cy is gradually enlarged from one end portion $17Ce_1$ thereof. In order to enable the inserting portions to securely fit, it is preferable that the attaching pipe portion is also formed to have a shape so as to align with the shape of the inserting portion to be fitted to the attaching portion.

Next, a method of connecting pipe using a branch pipe joint according to a first embodiment of the present invention will be explained hereunder.

Figure 15:
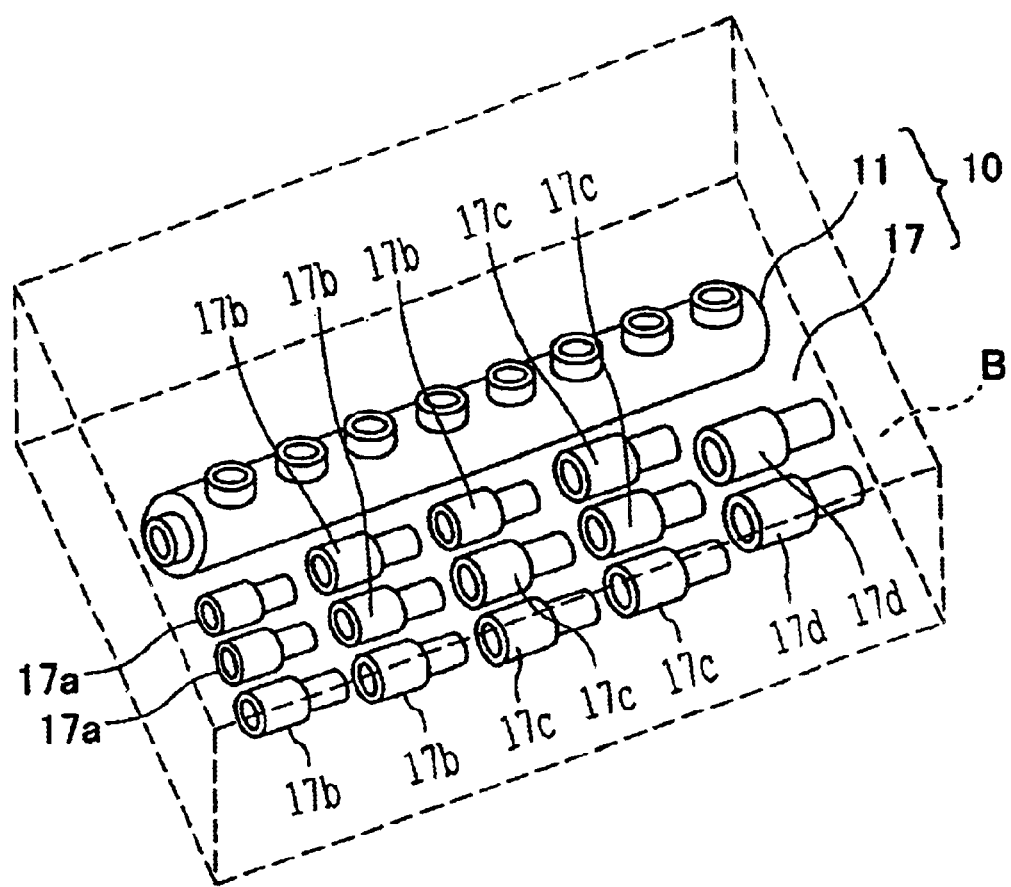
FIG. 15 is a schematic view exemplarily showing a packaging condition of the branch pipe joint according to the present invention before the branch pipe joint is assembled.
Figure 16:
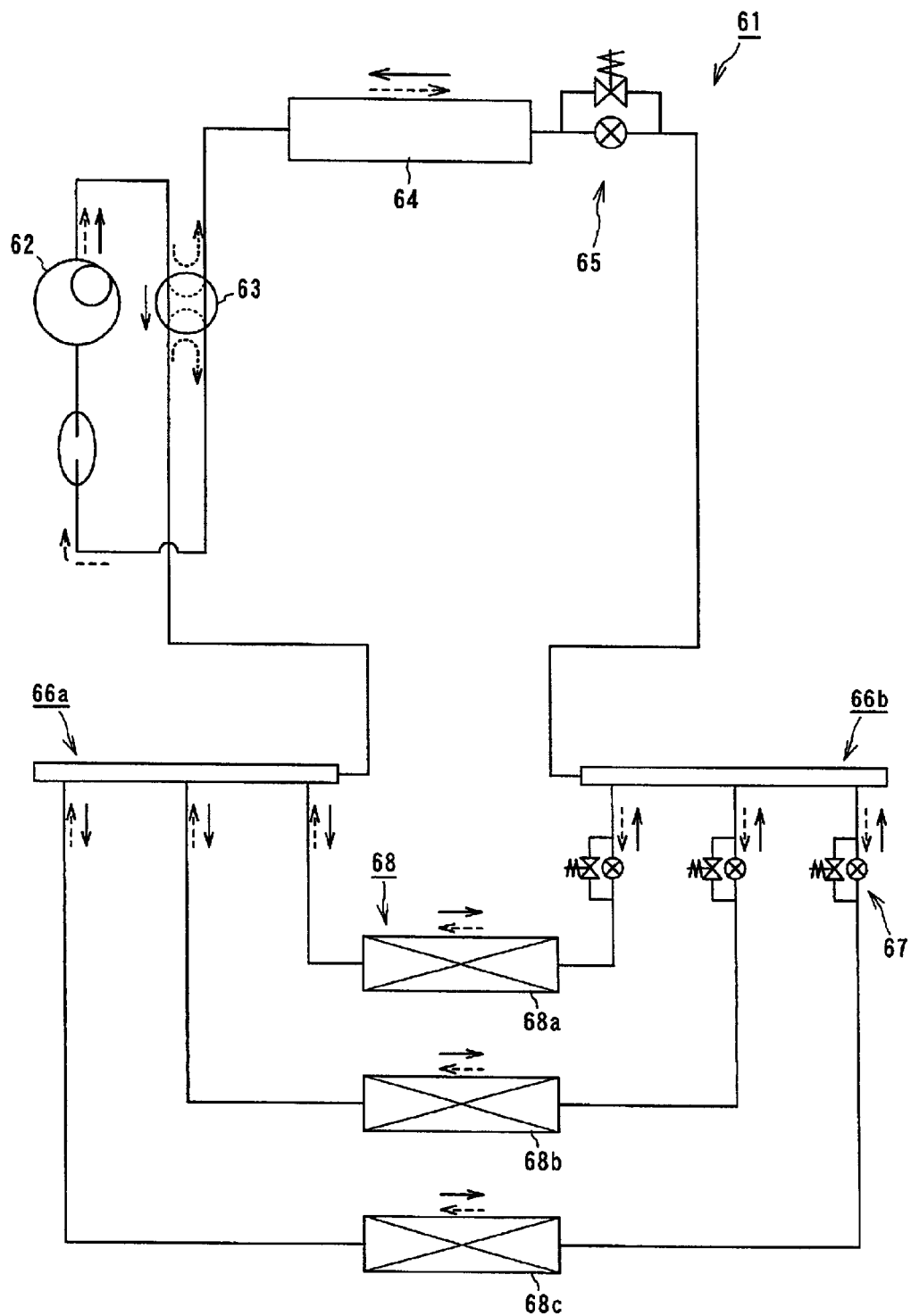
FIG. 16 is a schematic view showing a multiunit type air conditioner using a conventional branch pipe joint.
Figure 17:
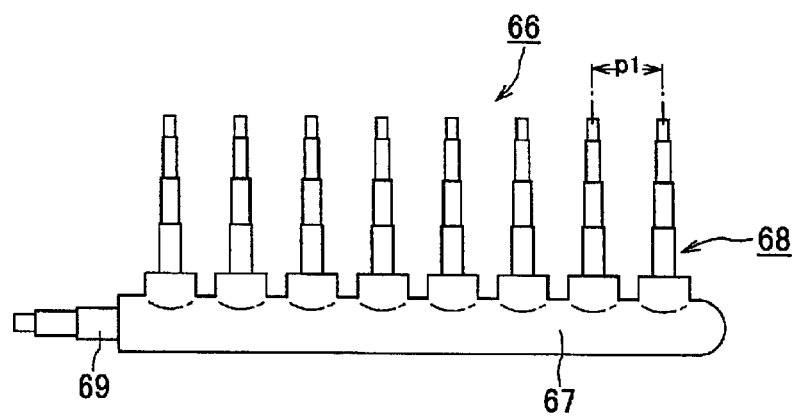
FIG. 17 is a front view showing a conventional branch pipe joint.
Figure 18:
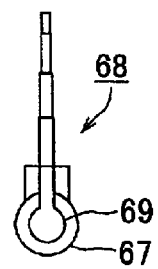
FIG. 18 is a side view showing a conventional branch pipe joint.
Figure 19:
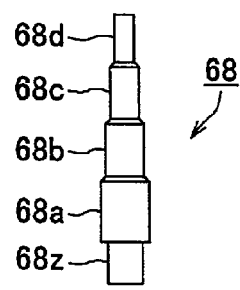
FIG. 19 is a front view showing a connecting pipe used in a conventional branch pipe joint.
Figure 20:
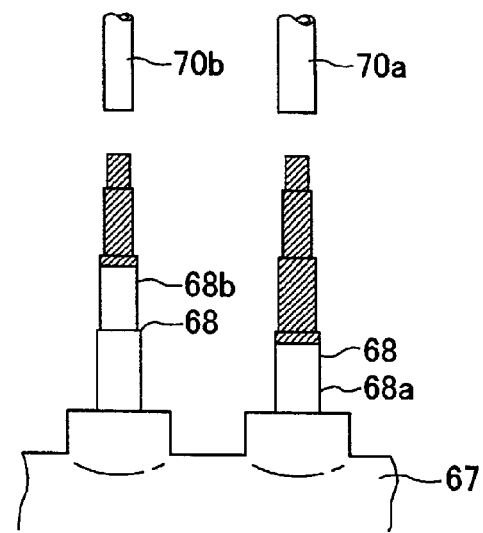
FIG. 20 is an explanatory view showing a method of connecting pipes using a conventional branch pipe joint.
Figure 21:
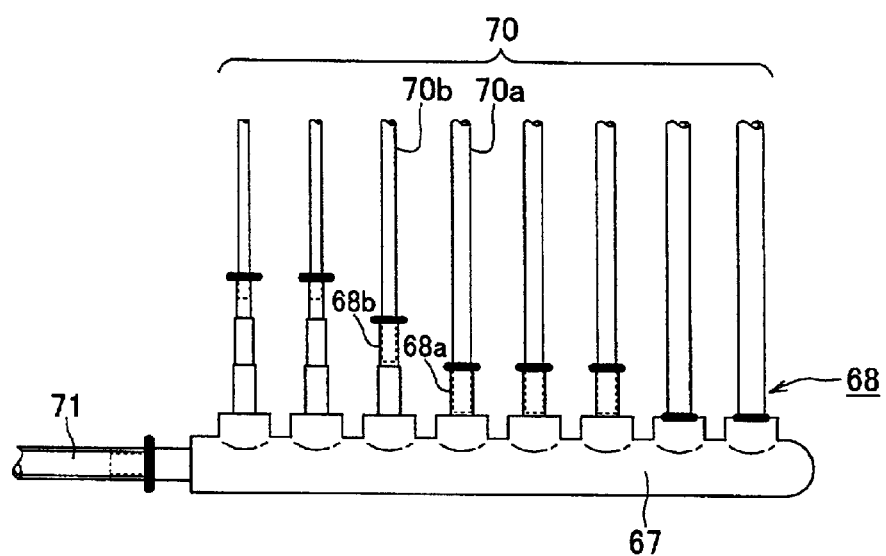
FIG. 21 is an explanatory view showing a state of the pipes connected by using a conventional branch pipe joint.

A packaging box B shown in FIG. 15 in which a set of materials of a branch pipe joint 10 before assembling are accommodated is delivered to an installation site for a multi-unit type air conditioner shown in FIG. 1, thereby to prepare the materials for assembling the branch pipe joint 10.

A branch pipe joint body 11 together with a group of connecting pipes as the materials of the branch pipe joint 10 are packed in one packaging box. The group of the connecting pipes contains a number of the connecting pipes, for example, at least the number of the connecting pipes corresponds to a number of the communication ports 13 formed in the branch pipe joint body 11. The group of the connecting pipes consist of a plurality of kinds of connecting pipes 17, for example, four kinds of connecting pipes 17 each having a different inner diameter.

For example, an explanation will be given of the case where the branch pipe joint body 11 is provided with eight communication ports 13 and the pipes to be connected consist of a pipe 5a having an outer diameter of 9.5 mm; pipes 5b, 5c each having an outer diameter of 12.7 mm; pipes 5d, 5e, 5f each having an outer diameter of 15.9 mm; and pipes 5g, 5h each having an outer diameter of 19.0 mm.

In the above case, for example, the group of the connecting pipes consists of two connecting pipes 17a, each having an inner diameter of 9.5 mm and an inserting portion 17y having the same outer diameter of 15.9 mm; five pieces of connecting pipes 17b each having an inner diameter of 12.7 mm; five pieces of connecting pipes 17c each having an inner diameter of 15.9 mm; and two pieces of connecting pipes 17d each having an inner diameter of 19.0 mm. In this example, it is explained that the inner diameter of each of the connecting pipes has the same sizes as the outer diameter of each of pipes. However, in actuality, the connecting pipes are formed to have inner diameters slightly lager than the outer diameters of the pipes so that each of the pipes can be inserted into the connecting pipe. As a result, the group of the connecting pipes consists of fourteen connecting pipes 17 in total, and the group of the connecting pipes 17, together with the branch pipe joint body 11, are packed in one packaging box B as shown in FIG. 15.

In general, the outer diameter of the pipe 5 is determined on the basis of the flow rate of refrigerant flowing in the outdoor side heat exchanger 4 and outdoor side heat exchanger 6. In accordance with a situation where large-scaled air conditioners are installed in buildings while relatively small scaled air conditioners are installed in the respective rooms of an ordinary housing, pipes having various outer diameters have been used for the air conditioners.

However, experience and statistics have shown the following fact. That is, there is a strong probability that pipes having an intermediate outer diameter are widely used. In this regard, in a case where the pipes 5 consist of eight kinds of pipes, the group of connecting pipes consisting of fourteen pieces of connecting pipes 17 as described above are prepared.

When the above group of connecting pipes are prepared, it becomes possible to cope with the demand for selecting a connecting pipe having a required inner diameter. Further, when control of the air conditioning equipment and piping thereof are performed by a computer, the number of the connecting pipes constituting the group can be reduced and it becomes possible to more accurately cope with the demand for selecting a connecting pipe having a required inner diameter.

In this connection, even in a case where the number of the communication ports 13 is eight, if a number of the communication ports 13 are plugged or closed and less than eight of the communication ports 13 are actually used, it is not always necessary to prepare a minimum number of eight or more of the connecting pipes. Further, in a case where the kinds of the pipes 5 are predicted to be less than four in advance, the connecting pipes 17 may consist of less than four kinds of connecting pipes 17 having different inner diameters.

Next, appropriate connecting pipes matching the outer diameters of the pipes 5 are selected from the group of the connecting pipes packed in the packaging box B. Then, as shown in FIGS. 4 and 7, the pipes 5 are fitted to the outer fitting portions 17z of the connecting pipes 17. Subsequently, the inserting portions 17y of the connecting pipes 17 are fitted into the communication ports 13 formed to the attaching portions 16 of the branch pipe joint body 11. In this case, since the shapes of the inserting portions 17y are identical to each other, the inserting portions 17y can be easily fitted into any of the communication ports 13. In the same manner as described above, the connecting pipes 17 capable of fitting to the respective pipes 5 are selected from the packaging box B, then all of the pipes 5 are connected to the branch pipe joint body 11 through the connecting pipes 17. Since the connecting pipes 17 are selected from the group consisting of a number of connecting pipes 17 having different inner diameters that are packed together with the branch pipe joint body 11 in the packaging box, the connecting pipes 17 having inner diameters corresponding to the outer diameters of the pipes 5 can be easily prepared.

Thereafter, the pipes 5, the connecting pipes 17 and the branch pipe joint body 11 are firmly fixed by various methods such as welding W, brazing, soldering or the like. It is preferable that the non-selected connecting pipes 17 remaining in the packaging box B are reused.

According to the method of connecting pipes using this branch pipe joint 10, since the connecting pipes 17 are selected from the group consisting of various connecting pipes so as to match to the outer diameters of the pipes 5 and then welded thereby to establish the communication in the air conditioner, unlike the conventional method, it is not necessary to select a position of the connecting pipe in accordance with an outer diameter of the pipe to be connected, and is not necessary to cut the connecting pipe at the position by means of a pipe cutter.

Further, there is no need to reshape the inner surfaces of the deformed connecting pipes and to perform a troublesome and complicated cleaning operation for removing copper powder generated by the cutting operations. Therefore, the air conditioner can be easily assembled without requiring the cutting operation for the connecting pipes. In addition, since the pipe cutter is not used for the connecting pipes, a space for operating the pipe cutter is not required. Accordingly, the pitch p between the adjacent connecting pipes 17 can be reduced to be about 80 mm which is ½ of that of conventional case, so that the branch pipe joint 10 can have a small size.

Next, a branch pipe joint according to a second embodiment of the present invention will be explained hereunder.

The branch pipe joint of the second embodiment is a yoked-type branch pipe joint 20 (20a, 20b).

Figure 11:
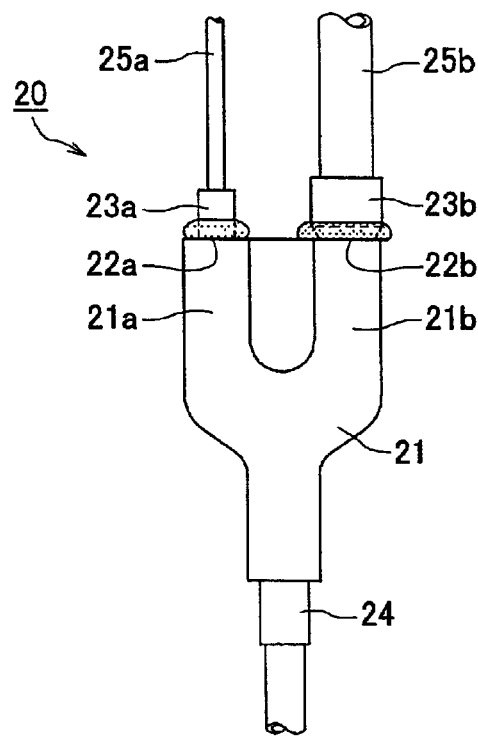
FIG. 11 is a front view showing a second embodiment of a branch pipe joint according to the present invention.

As shown in FIG. 11, this yoked-type branch pipe joint 20 is formed of copper and has a hollow cylindrically closed shape, and comprises: a branch pipe joint body 21 formed by drawing work and shaping work; branched portions 21a, 21b provided to the branch pipe joint body 21 for constituting projecting portions through which a fluid flows in a branched manner; two pieces of connecting pipes 23a, 23b whose inserting portions (not shown) have the same outer diameter, one end of the connecting pipes being connected to the respective communication ports 22a, 22b while the other ends being connected to one of the plurality of pipes; and a common pipe connecting portion 24 formed in the branch pipe joint body 21 through which the fluid flows in a confluent state.

For example, an explanation will be given of the case where the branch pipe joint body 21 is provided with two communication ports 22a, 22b of the branch pipe joint 20 and the pipes to be connected consist of a pipe 25a having an outer diameter of 19.0 mm and a pipe 25b having an outer diameter of 50.8 mm.

In the above case, for example, the group of the connecting pipes consists of one connecting pipe having an inner diameter of 9.5 mm, one connecting pipe having an inner diameter of 12.7 mm; two connecting pipes each having an inner diameter of 15.9 mm; two connecting pipes each having an inner diameter of 19.0 mm; and one connecting pipe having an inner diameter of 50.8 mm. As a result, the group of the connecting pipes consists of seven connecting pipes in total, and the group of the connecting pipes together with the branch pipe joint body 21 are packed in one packaging box.

As the same manner as in the aforementioned branch pipe joint 10 of the first embodiment, the pipes are connected by using the connecting pipes selected from the group consisting of various connecting pipes, thereby to prepare the branch pipe joint of the second embodiment.

Further, a modified embodiment of the first embodiment will be explained hereunder.

Unlike the first embodiment, the branch pipe joint of this modified embodiment is constituted in such a manner that all of the pipes are not connected to the branch pipe joint body through the connecting pipes but a number of the pipes are directly communicated with the branch pipe joint body without using the connecting pipes.

Figure 12:
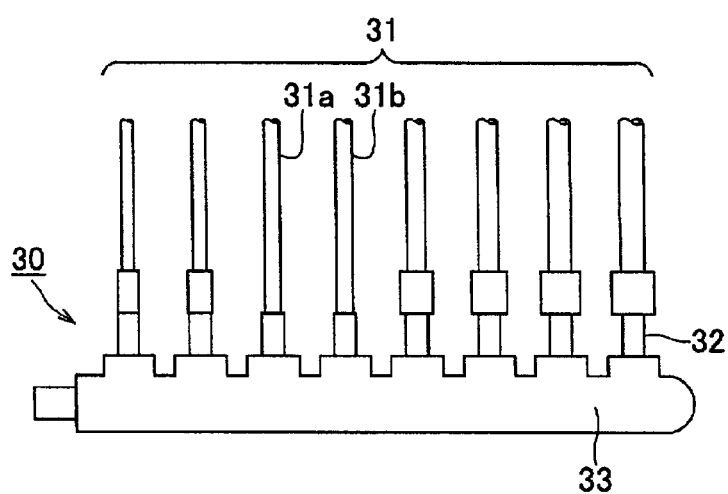
FIG. 12 is a front view showing a modification of the first embodiment of the branch pipe joint according to the present invention.

As shown in FIG. 12, in the branch pipe joint 30 of this modified embodiment, since the outer diameters of a part of the pipes 31a, 31b among the pipes 31 have suitable sizes for fitting to the attaching pipe portions 32 having appropriate inner diameters, these pipes 31a, 31b can be directly connected to the attaching pipe portions 32 without using the connecting pipes. When the attaching pipe portions 32 having typical inner diameters are provided to the branch pipe joint body 33 and then the pipes are directly communicated with the attaching pipe portions 32, the number of the connecting pipes to be used, as well as the number and kinds of the connecting pipes constituting the group can be effectively reduced.

Furthermore, a modified embodiment of the second embodiment will be explained hereunder.

Unlike the second embodiment, the branch pipe joint of this modified embodiment is constituted in such a manner that the two pipes are not connected to the branch pipe joint body through the connecting pipes but one pipe is directly communicated with the branch pipe joint body without using the connecting pipe.

Figure 13:
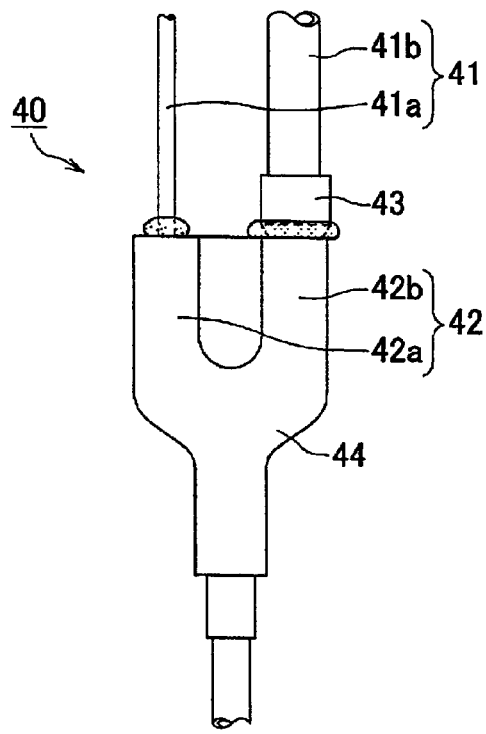
FIG. 13 is a front view showing a modification of the second embodiment of the branch pipe joint according to the present invention.

As shown in FIG. 13, in the branch pipe joint 40 of this modified embodiment, since the outer diameter of one pipe 41a among the pipes 41 has a suitable size for fitting to the branching portion 42a having appropriate inner diameter, this pipe 41a can be directly connected and fixed to the branching portion 42a without using the connecting pipe while only the pipe 41b is connected and fixed to the branching portion 42b through the connecting pipe Here also, when the branching portions 42 having typical inner diameters t are provided to the branch pipe joint body 44, the chance that the pipes 41 are directly communicated with the branching portions 42 is increased, and the number and kinds of the connecting pipes to be used can be effectively reduced.

Still further, a modified embodiment of the connecting pipe used in the first and second embodiments will be explained hereunder.

Figure 14:
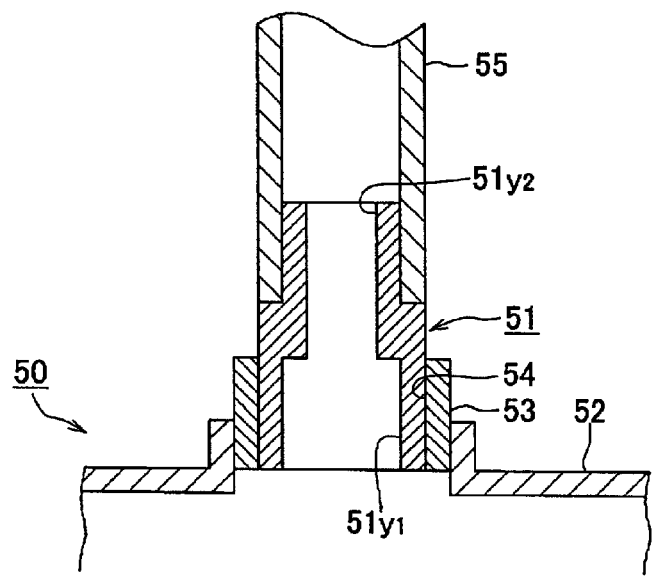
FIG. 14 is a cross sectional view showing a modification of the first and second embodiments of a connecting portion of the branch pipe joint according to the present invention.

As shown in FIG. 14, in the branch pipe joint 50 of this modified embodiment, both end portions of the connecting pipe 51 are formed with inserting portions $51y_1$, $51y_2$ in an axial direction, and the inserting portions $51y_1$ is fitted into the communication port 54 provided in the attaching pipe portion 53 of the branch pipe joint body 52 while the inserting portion $51y_2$ is inserted in the pipe 55.

According to the above arrangement, the same effects as in the connecting pipe of the second embodiment can be expected. In addition, when the connecting pipe 51 is turned upside down, the connecting pipe 51 can be also used as a connecting pipe in the first and second embodiments. Further, when the connecting pipe in the first and second embodiments are inverted, the inverted connecting pipes can be also used as the connecting pipe 51 for this modified embodiment.

In this connection, both end portions of the connecting pipe to be used in the branch pipe joint according to the present invention may be inserted into the pipes or the attaching pipe portion. In another way, the connecting pipe can be also fitted over one of the pipe or the attaching portion, while fitted into the other member in an inserting manner. As the fitting type for fitting the connecting pipes, pipes and the attaching pipe portions, various fitting types such as fitting over-type and inserting-type or the like can be suitably adopted.

Although the present invention has been described with reference to the exemplified embodiments, it will be apparent to those skilled in the art that various modifications, changes, omissions, additions and other variations can be made in the disclosed embodiments of the present invention without departing from the scope or spirit of the present invention. Accordingly, it should be understood that the present invention is not limited to the described embodiments, and shall include the scope specified by the elements defined in the appended claims and range of equivalency of the claims.

What is claimed is:

1. A method of connecting refrigerant pipes of a multi-unit type air conditioner, the method comprising the steps of:

preparing a branch pipe joint body having a hollow shape and a plurality of communication ports each having the same inner diameter;

selecting connecting pipes from a group of connecting pipes at an installation site of the multi-unit type air conditioner, each of the selected connecting pipes having one end portion having an outer diameter enabling the one end portion to be fitted to said communication ports and another end portion having an inner diameter enabling the another end portion to be fitted to one of the plurality of the refrigerant pipes having different outer diameters, said group of connecting pipes and said branch pipe joint body having been packed in one package; and connecting said branch pipe joint body to said refrigerant pipes through the selected connecting pipes using firm fixing, wherein the number of said connecting pipes in said group of connecting pipes is larger than the number of said communication ports, and is set such that each of a number of connecting pipes having a minimum inner diameter and a number of the connecting pipes having a maximum inner diameter are smaller than a number of the connecting pipes having inner diameters other than the minimum and maximum inner diameters, and wherein some of said communication ports are directly firmly fixed to some of said refrigerant pipes without using the connecting pipes.

* * * * *